United States Patent [19]
Lewis et al.

[11] 3,971,997
[45] July 27, 1976

[54] SEA SPIKE SUPPRESSION TECHNIQUE
[75] Inventors: Bernard L. Lewis, Oxon Hill; Irwin D. Olin, Potomac, both of Md.
[73] Assignee: The United States of America as represented by the Secretary of the Navy, Washington, D.C.
[22] Filed: May 28, 1975
[21] Appl. No.: 581,502

[52] U.S. Cl. ............................... 328/165; 343/7.7; 329/132
[51] Int. Cl.² ........................................ H04B 1/10
[58] Field of Search ............... 328/99, 165; 343/7.7; 329/131, 132

[56] References Cited
UNITED STATES PATENTS

| | | |
|---|---|---|
| 3,042,915 | 7/1962 | Nordell .............................. 343/7.7 |
| 3,072,855 | 1/1963 | Chandler ............................ 328/165 |
| 3,109,171 | 10/1963 | Henry et al. ........................ 343/7.7 |
| 3,371,342 | 2/1968 | Carre .............................. 328/165 X |
| 3,733,605 | 5/1973 | Osterman ............................ 343/7.7 |

*Primary Examiner*—John S. Heyman
*Attorney, Agent, or Firm*—R. S. Sciascia; Philip Schneider; Norman Brown

[57] ABSTRACT

A technique for detecting and eliminating "sea-spike" interference in a return radar-signal. A series of signal delay means in cooperation with associated subtractors are utilized to detect particular sea-spike modulation interference frequencies. Detection of these modulation frequency components causes activation of means for preventing the sea-spike contaminated return signal from being further processed.

9 Claims, 2 Drawing Figures

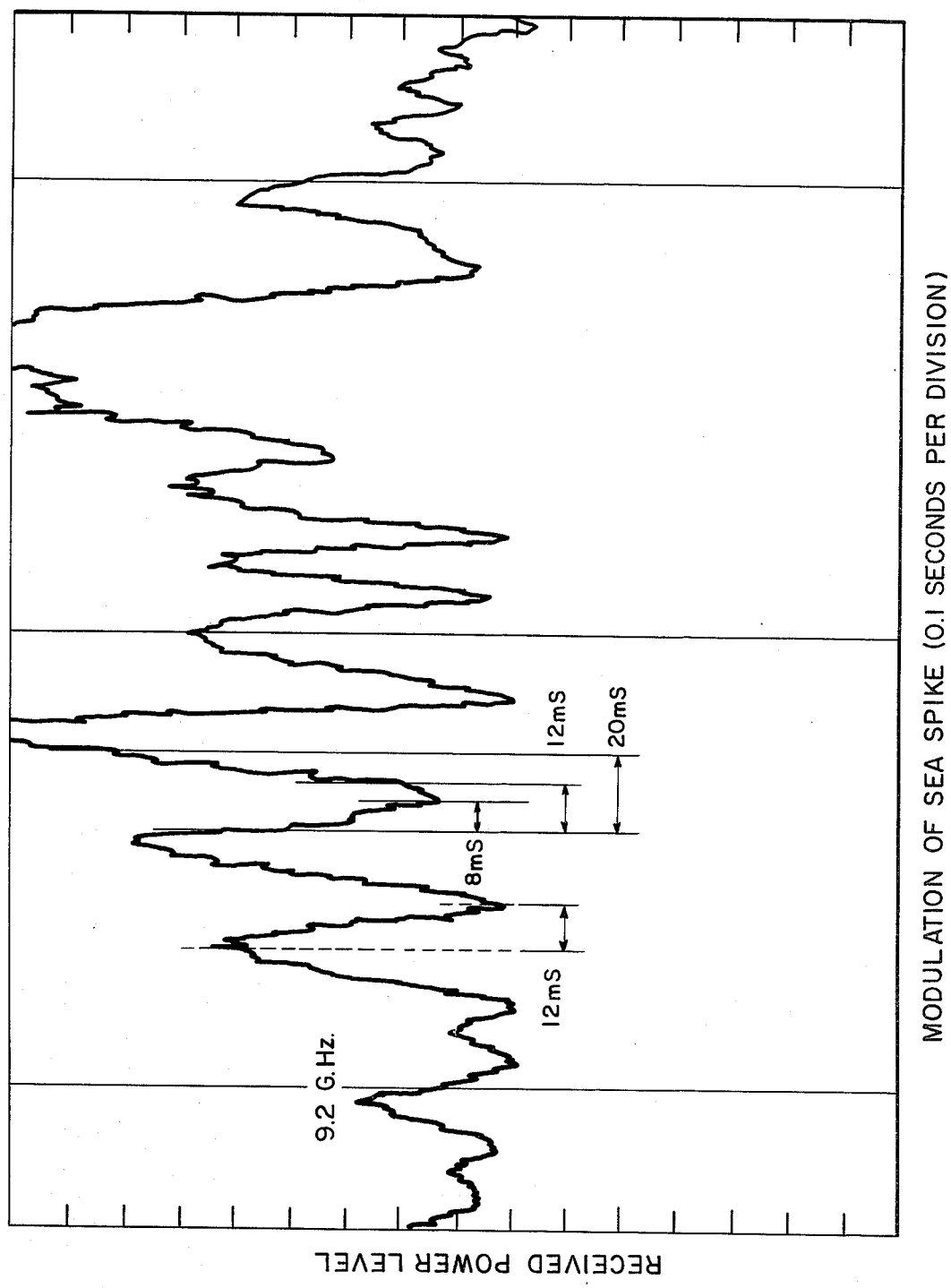

SEA SPIKE SUPPRESSION TECHNIQUE

BACKGROUND OF THE INVENTION

The present invention relates to signal interference-eliminating systems, and more particularly to an improved technique for reducing sea-spike interference in radar systems.

When the beam of a radar system is directed over an ocean surface, particularly when the radar system is attempting to detect small targets floating on the surface, interference, termed sea-spike interference, occurs.

Sea-spike interference is imposed upon radar signals by radar-reflective portions of waves which reflect a portion of transmitted radar energy back to the radar receiver and thus interfere with, or mask, detection of radar targets. Sea-spike interference will generally increase the false alarm rate in automatic target detectors as well as make more burdensome a radar display operator's vigilance task. Prior methods of suppressing sea-spike interference involved high scan-rate antennas with scan-to-scan intergration, or have resorted to frequency diversity techniques. The scan-to-scan averaging is incoherent and can only yield a limited amount of suppression even if relatively long averaging times are applied. Frequency diversity techniques depended upon the target echo being much less sensitive to small changes in radar carrier frequency than is the echo from the portion of sea surface causing the sea-spike.

The present invention is an improved technique for eliminating sea-spikes which is economical, simple, and effective.

SUMMARY OF THE INVENTION

The technique of the present invention detects amplitude modulation components of sea-spike interference. The modulation rate is proportional to the growth and decay of Fresnel zone interference associated with an increase or decrease of radar reflective portions of waves causing the interference.

The modulation caused by sea-spike interference has been found to exist at frequencies which are in known relation to that of the transmitted energy. The return radar energy is examined for modulation content of these predetermined frequencies indicative of sea-spike interference. The examination and detection is accomplished through various delay means (whose delay is related to the modulation frequency) and elements for comparing energy content at various time-delay periods of the received signal in order to sense an energy difference indicative of modulation.

The present invention is based upon the fact that sea-spikes have been found to be nearly 100 percent modulated at a frequency directly proportional to the radar frequency. This modulating frequency also has been found to be essentially independent of sea state. The invention is also based on the fact that targets floating on the ocean will not be heavily modulated at frequencies as high or higher than that of sea-spikes. Additionally this invention is based on the fact that sea-spikes are very improbable in any given range resolution cell and that they only persist for one or two seconds in any cell when they do occur. The present invention takes advantage of these facts to greatly suppress the spike echoes without significantly reducing the probability of detecting target echoes.

It is therefore an object of the present invention to detect sea-spike interference in a return radar signal.

It is another object of the present invention to detect particular modulation components associated with sea-spike interference.

It is a further object of the present invention to prevent radar signals contaminated by sea-spike interference from being further processed.

Other objects, advantages and novel features of the invention will become apparent from the following detailed description of the invention when considered in conjunction with the accompanying drawings wherein:

DESCRIPTION OF THE DRAWINGS

FIG. 2 is a plot of sea spike modulation imposed on a radar signal.

DETAILED DESCRIPTION OF THE INVENTION

Figure 1:
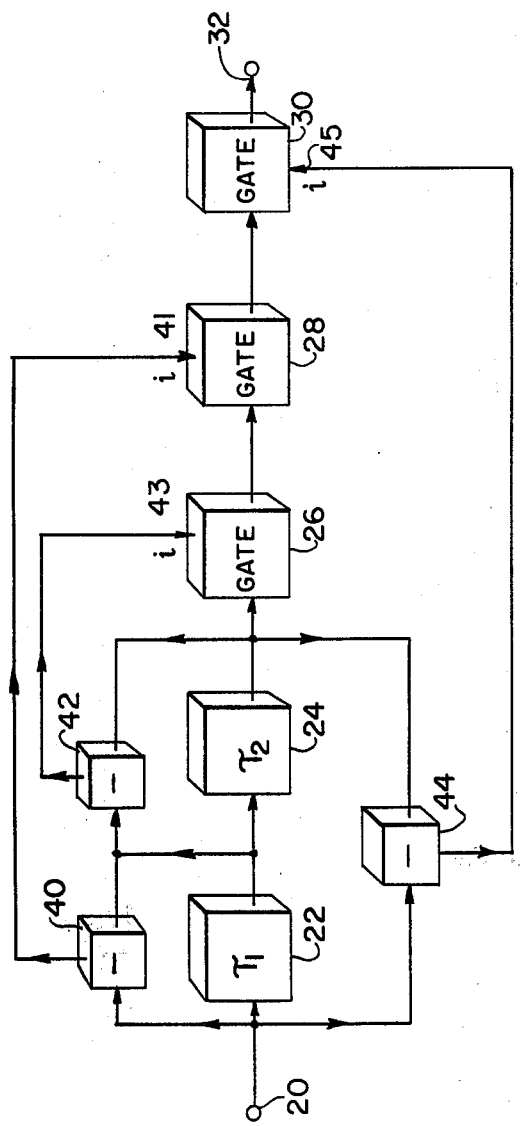
FIG. 1 depicts in block diagram schematic fashion an embodiment of the present invention.

A radar signal video input terminal 20 is connected to a first delay means 22 which has its output connected to a second delay means 24. The output of second delay means 24 is in turn coupled to the input of an electronic switch, or gate, 26 whose output in turn is coupled to the input of a second gate 28. The output of gate 28 is coupled to the input of a gate 30 whose output terminal 32 forms the output terminal of the system.

A first subtractor device 40 has a first input terminal connected to the input to delay means 22 and a second input terminal connected to the output of delay means 22. The output of subtractor 40 is coupled to a control terminal 41 of gate 28. A second subtractor 42 has a first input terminal coupled to the input of delay device 24 and a second input terminal coupled to the output of delay device 24. The output of subtractor 42 is connected to a control terminal 43 of gate 26. A third subtractor device 44 has one input terminal coupled to the input of first delay device 22 and a second input terminal coupled to the output of second delay device 24. The output of subtractor 44 is connected to a control terminal 45 of gate 30.

In operation, radar signals (including those contaminated by sea-spike interference modulation) are received at input terminal 20. This signal is serially delayed by delay means 22, 24, each delay being equal to a fraction of the period of modulation found in sea-spike interference. A delay line may typically be utilized as a delay means. Although only two delay means are utilized in this described embodiment, many more may be used, if desired.

The delayed signals are compared in subtractors 40, 42, and 44. FIG. 2 indicates typical points at which samples are compared. An energy difference (exceeding a predetermined threshold) as sensed by a subtractor causes generation of an output signal. This signal is present during the entire period that the greater-than-threshold energy difference is sensed. This difference is then indicative of the existence of a signal modulation at a predetermined frequency. In other words, the subtractors utilized in combination with the delay means detect the fluctuations in the received energy imposed by the sea-spike (since a particular modulation frequency will have an associated peak-to-null energy fluctuation time).

When a subtractor output signal occurs, it is applied to a corresponding inhibit terminal of one of gates 26, 28, 20 thereby preventing the input signal at terminal 20 from reaching output terminal 32 whenever a subtractor output signal is present. In other words, when the subtractors detect an energy difference indicative of sea-spike interferencce, the subtractor output signal activates an inhibit gate preventing the sea-spike contaminated signal return energy from being displayed on a radar display or other apparatus utilizing the returned energy. Obviously the described technique of this invention is applicable whenever it is desired to eliminate interference caused by signal modulation.

The frequency of amplitude modulation ($f_{modulation}$) caused by sea-spike interference is related to the rate of growth or decay i.e., $d/dt\,(\delta R)$ of the radar reflective portion $\delta R$ of the wave, and to the radar frequency ($f_{radar}$) in accordance with the following:

$$f_{modulation} = \frac{2\,(f_{radar})\,(\frac{d}{dt}(\delta R))}{c},$$

where c is the speed of light ($\sim 10^9$ ft/sec). It has been found that the rate of growth or decay is approximately equal to 3 ft/sec. Thus the modulation interference frequency is related to the frequency of the radar by: $f_{modulation} = (6 \times 10^{-9})\,f_{radar}$.

As an example, a radar signal transmitted at a frequency of 10 GHz would have sea-spike modulation of 60 Hz. The associated time between peaks and nulls is in the range of 8 milliseconds. Therefore the first delay 22 is chosen to be 8 ms, and the second delay to be 12 ms. This provides three time separated samples (i.e. different phase samples) at 8, 12, and 20 ms. As can be seen from FIG. 2, these time periods will allow detection of the modulation induced energy variations associated with sea-spike interference.

At radar frequencies of interest, the sea-spike modulation frequencies might range from about 25 to about 100 Hz. The first and second delays might be chosen to be 4 and 8 msecs, respectively, the principle of selection being to select suitable delays which would be at such phases of the possible modulation frequencies that a difference in modulation signal amplitude would always be present at one of the subtractor outputs.

Thus, the technique of the present invention provides a simple although effective means for detecting and suppressing sea-spike interference (or other modulation-type interference of similar nature) by detecting the modulation frequency components and then preventing the interference contaminated signal from being further processed.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of detecting interference in received signal energy comprising the steps of:
examining said energy for interference modulation in a predetermined frequency range related to the interference inducing phenomena;
producing an interference-detected signal upon detection of at least one modulation component existing at at least one predetermined frequency;
using said interference-detected signal to eliminate the presence of the interference-modulated signal.

2. The method of detecting interference of claim 1 wherein the step of examining energy comprises the steps of:
delaying for a plurality of different times said received energy;
comparing the energy level at selected ones of said different times;
generating said interference-detected signal upon at least one said difference between said compared energy levels exceeding a predetermined threshold.

3. The method of claim 1 wherein said modulation frequency is approximately equal to $6 \times 10^{-9}$ times the frequency of said received signal energy.

4. A system for preventing processing of a signal contaminated by modulation interference comprising:
means, connected to receive said contaminated signal, for delaying said signal for predetermined periods of time, whereby serially delayed portions of the signal are made available at terminals of said delay means;
means coupled to said delay means for comparing the energy content of said signal at selected ones of said predetermined periods of time and for generating an output signal as long as the difference in said energy content exceeds a predetermined threshold; and,
means coupled to that delay means whose output terminal contains the most delayed portion of the signal, said means having control means coupled to said comparison means for receiving its output signal, whereby the signal containing said modulation interference will be prohibited from passing during the receipt of said control signal.

5. Apparatus for selectively preventing or permitting passage of a signal, the received signal being either a modulated or unmodulated carrier signal, the modulation signal lying in a given range of frequencies, said apparatus comprising:
at least a pair of delay means coupled in series, the received signal being fed to the first delay means as an input signal, the delays being different and suitable, either separately or in combination, to provide at least one phase interval, with respect to the modulation signal, which presents a difference in modulation-signal amplitude at the beginning and end of said phase interval;
at least three subtraction means for subtracting one input signal from another,
the first subtraction means receiving as inputs the received signal and the output of said first delay means,
the second subtraction means receiving as inputs the outputs of said first and second delay means,
the third subtraction means receiving as inputs the received signal and the output of said second delay means; and
at least three gating means in series connection, each for preventing passage of an input signal when a control signal is applied thereto.
the first gating means receiving the output of said second delay means as an input signal and the output of one of said subtraction means as a control signal,
the second receiving the output of said first gating means as an input signal and the output of another subtraction means as a control signal,
the third receiving the output of said second gating means as an input signal and the output of the remaining subtraction means as a control signal.

a difference in amplitude of signals at the inputs of any of said subtraction means resulting in an output signal therefrom which closes its associated gate so that the delayed received signal is prevented from being passed therethrough.

6. Apparatus as set forth in claim 5, wherein each said subtraction means is constructed to have a predetermined threshold level of operation whereby no output signal is produced until the difference in signal level of its input signals is greater than the threshold level.

7. Apparatus as set forth in claim 5, wherein the carrier signal comprises a series of pulses of high-frequency electromagnetic energy such as used in radar equipment.

8. A method for preventing passage of a received signal comprising modulated pulses in a series of high-frequency-carrier pulses, the modulation signal lying in a given range of frequencies, comprising the steps of:
 delaying the received signal by at least two different delay intervals, the delay intervals being suitable, either separately or in combination, to provide at least one phase interval, relative to the modulation signal, which provides a difference in modulation-signal amplitude;
 obtaining signals corresponding to the amplitudes of the delayed pulses at the beginning and end of each said interval and subtracting these signals from each other and from the undelayed signal in three different combinations so that three difference signals representing three different time intervals of the modulation signal are obtained; and
 controlling the closing of three gating circuits with these difference signals, each gating circuit being controlled by a different one of said difference signals, the delayed received signal being fed to the gating circuits as an input and the presence of any difference signal operating to open its associated gating circuit to prevent passage of the received signal.

9. A method as in claim 8, wherein the received signal is the return signal from a pulsed-radar transmitted signal projected for illumination of the surface of the sea.

* * * * *